J. E. POINTON.
DOUGH MOLDING MACHINERY.
APPLICATION FILED DEC. 10, 1913.

1,157,579.

Patented Oct. 19, 1915.
2 SHEETS—SHEET 1.

WITNESSES

INVENTOR
John Edward Pointon
BY
ATTORNEYS

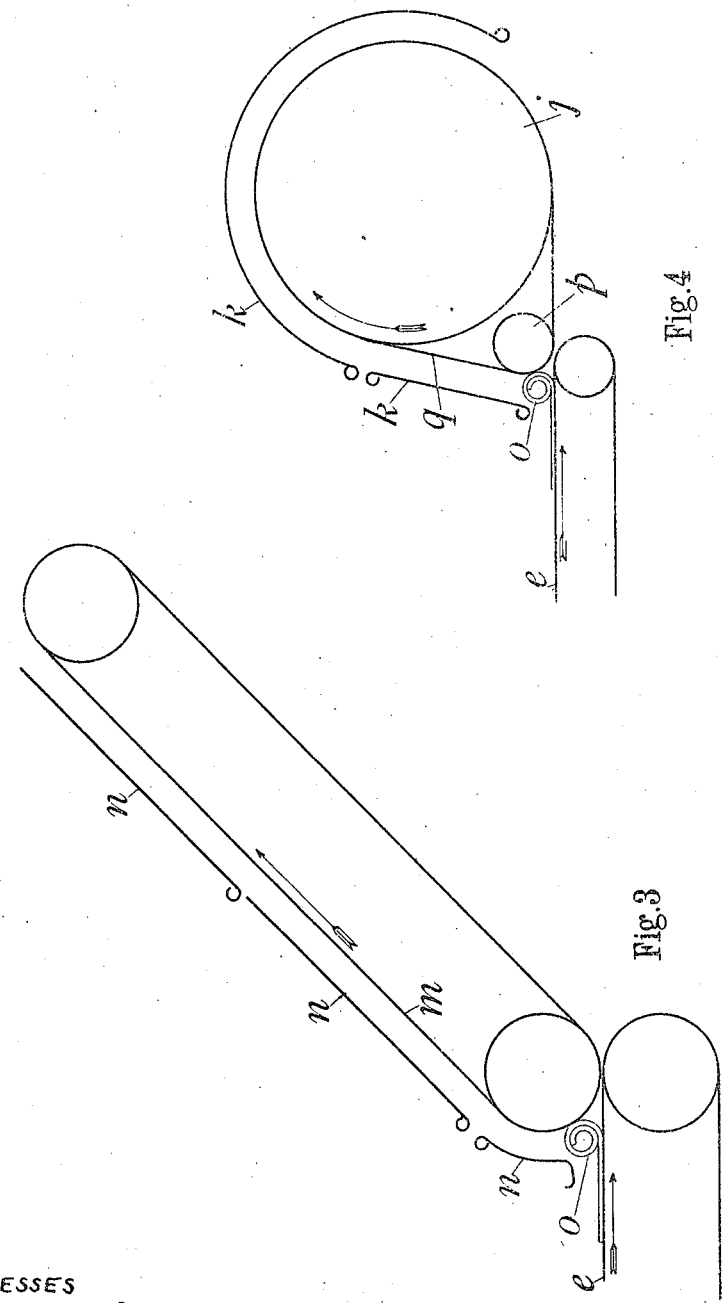

UNITED STATES PATENT OFFICE.

JOHN EDWARD POINTON, OF PETERBOROUGH, ENGLAND.

DOUGH-MOLDING MACHINERY.

1,157,579.   Specification of Letters Patent.   Patented Oct. 19, 1915.

Application filed December 10, 1913. Serial No. 805,747.

*To all whom it may concern:*

Be it known that I, JOHN EDWARD POINTON, subject of the King of Great Britain, residing at Westwood Works, Peterborough, in the county of Northants, England, engineer, have invented certain new and useful Improvements Relating to Dough-Molding Machinery, of which the following is a specification.

This invention relates to the molding or like treatment of dough such as is used, for example, in the production of what are known as tin or pan loaves (from the fact that they are baked in tins or pans), or any other type of loaf which is flattened, folded and rolled.

The object of the invention is to provide simple and reliable mechanical means for effecting the said molding.

The invention comprises the combination with compression bands or rolls of conical folding rollers and a coiling trough.

Figure 1:
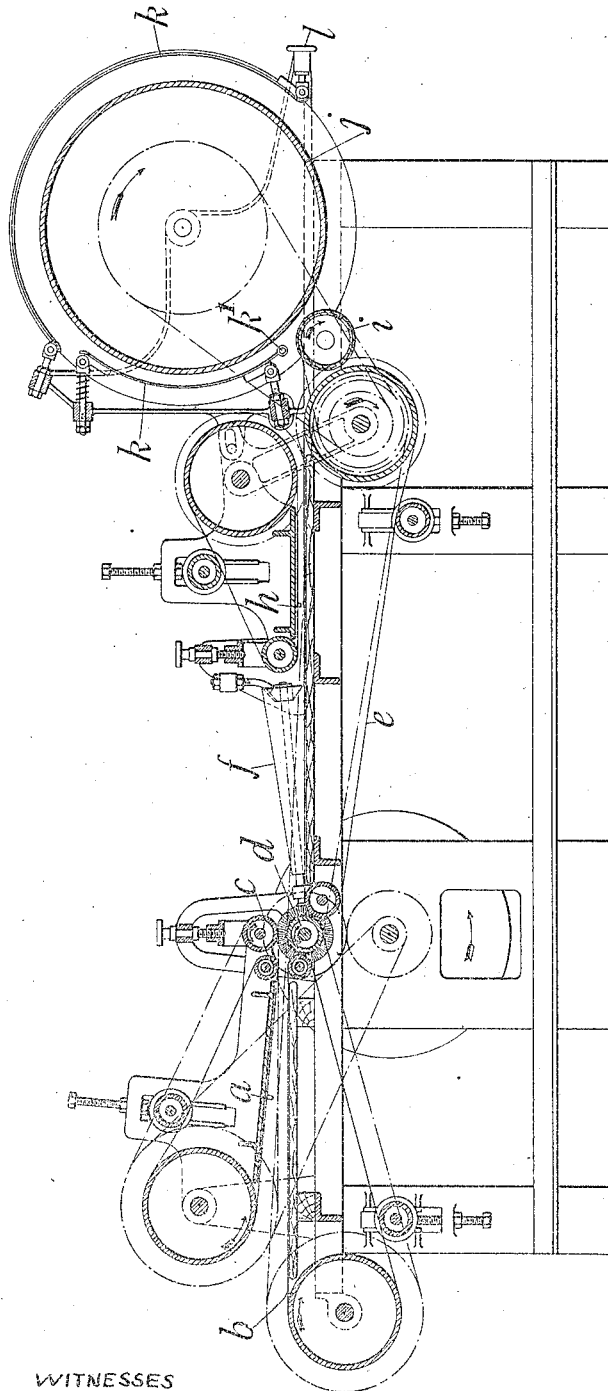
Figure 2:
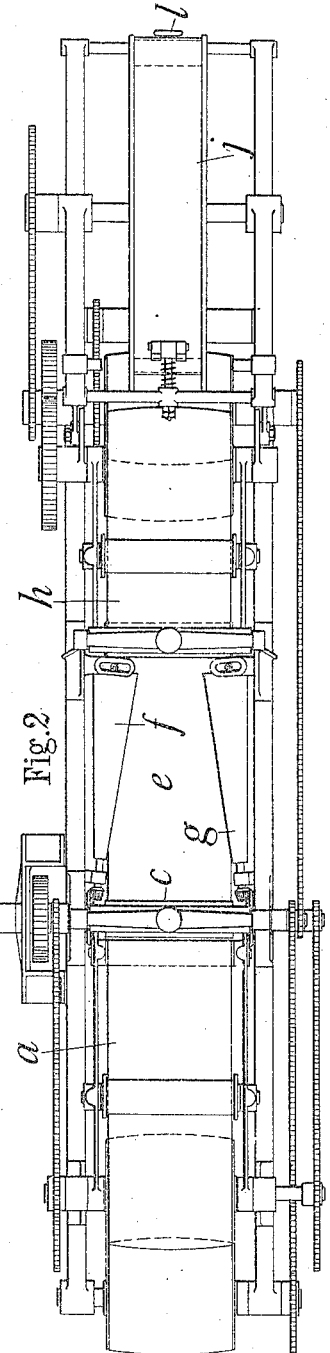

Referring to the two accompanying sheets of explanatory drawings:—Figure 1 is a side elevation and Fig. 2 a plan showing a machine constructed in accordance with this invention. Figs. 3 and 4 are diagrammatic views showing modified forms of construction.

The same reference letters in the different views indicate the same or similar parts.

In one convenient application of the invention as illustrated by the machine shown in the drawings, the ball like dough portions are delivered from the dividing machine or proving apparatus between the compression bands $a$ $b$ and rolls $c$ $d$, adapted to flatten the said portions and pass them on to the belt or other conveyer $e$ which is preferably arranged for continuous movement. The peripheral speed of the rolls $c$ $d$ is greater than the speed of the bands $a$ $b$, so that a stretching of the dough portions or sheets takes place between the said bands and rolls. From the said flattening rolls or their equivalent the sheeted or slabbed dough portions are carried by the conveyer $e$ between laterally disposed conical rolls $f$ $g$ whereby the sheets or slabs are folded over from opposite sides so that their edges meet in the center or even overlap. By continued movement with the conveyer $e$ the folded dough portions are brought under the action of a compression band $h$ or rolls. As they leave such compression band or rolls the forward ends of the dough portions are brought into contact with a roll as $i$ running in the same direction to that of the conveyer $e$ and adapted, in conjunction with the drum $j$ and the end $k'$ of the pressure band $k$, to turn over the said forward ends so that the dough portions commence to coil or roll up.

The completion of the coiling and the required compression of the coils is preferably effected by causing them to pass through the trough or channel formed between the periphery of the rotating drum $j$ and the pressure band $k$ or its equivalent extending around the drum or a portion of the same. The said band $k$ is, in the example shown, made in two portions, the first portion being anchored at the end $k'$ while the opposite end has a spring connection as shown to provide for the necessary yielding as the dough portions increase in diameter as they coil up between the band and the drum. The second portion of the band serves to finally compress the coil and to seal or close the convolutions of the same, the amount of compression being regulated by the screw $l$.

The constructional details of the machine may be varied as is found necessary or desirable to meet varying services or requirements. Thus, instead of forming the moving surface or carrier portion of the coiling trough or channel from the drum $j$ and the circular band $k$ as aforesaid, the moving surface or carrier may be formed by a belt conveyer $m$ arranged at any suitable position relatively to the conveyer $e$, such as shown at Fig. 3. The fixed surface of the trough is provided by the straight parts $n$ which are the equivalent of the curved parts forming the band $k$ in the example shown at Figs. 1 and 2, the dough piece $o$ being coiled and compressed as it is rolled along the inner surface of $n$ by the carrier or conveyer $m$.

In the further modification illustrated at Fig. 4, there is employed in connection with the drum $j$ and pressure band $k$ (such as are used in the example at Figs. 1 and 2) an additional coiling roll as $p$ with a band as $q$ which drives the roll $p$ from the drum $j$ and also serves as the conveyer or carrier portion of the coiling trough or channel.

Having thus described my invention what I claim as new and desire to secure by Letters Patent is:—

1. A machine for molding dough lumps into a convolute form, consisting of means for sheeting the dough lumps, means for folding the sheets, and means for convolving the folded sheets into continuous circular coils, as set forth.

2. A machine for molding dough lumps into a convolute form, consisting of means for sheeting the dough lumps, means for stretching the sheets, means for folding the stretched sheets, and means for convolving the folded and stretched sheets into continuous circular coils, as set forth.

3. A machine for molding dough lumps into a convolute form, consisting of means for sheeting the dough lumps, means for folding the sheets, means for compressing the folded sheets, and means for convolving the folded and compressed sheets into continuous circular coils, as set forth.

4. A machine for molding dough lumps into a convolute form, consisting of compression bands between which the dough lumps are sheeted, rolls whereby the sheets are stretched, conical rolls whereby the sheets are folded from opposite sides, a compressor for the folded sheets, and means for convolving the said sheets into continuous circular coils, as set forth.

In testimony whereof I have signed my name to this specification in the presence of two subscribing witnesses.

JOHN EDWARD POINTON.

Witnesses:
 BERTRAM H. MATTHEWS,
 WILLIAM H. BIRD.